United States Patent [19]
Winn

[11] 3,747,997
[45] July 24, 1973

[54] HYDRODYNAMIC FOIL BEARINGS
[75] Inventor: Leo W. Winn, Schenectady, N.Y.
[73] Assignee: Mechanical Technology Incorporated, Latham, N.Y.
[22] Filed: July 22, 1971
[21] Appl. No.: 165,033

[52] U.S. Cl. ................................................. 308/9
[51] Int. Cl. ............................................ F16c 17/16
[58] Field of Search .................................. 308/9, 73

[56] References Cited
UNITED STATES PATENTS
2,306,048  12/1942  Fost ..................................... 308/73
3,382,014  5/1968   Marley ................................. 308/9
3,506,314  4/1970   Gross et al. ......................... 308/9
1,384,173  7/1921   Wikander ............................. 308/26

Primary Examiner—Charles J. Myhre
Assistant Examiner—Frank Susko
Attorney—Joseph V. Claeys et al.

[57] ABSTRACT

A hydrodynamic bearing system is provided wherein a resilient bearing insert structure is disposed within the spacing defined by the confronting surfaces of a first member (such as a housing with an opening) and a second member (such as a shaft received within the opening) which are movable (rotatable) relative to one another. The resilient bearing insert structure includes one or more bearing elements which are preformed (such as with corrugations of generally Z configuration) to provide one or more load supporting regions each of which includes two coacting operating portions one portion coacting with the rotating shaft to create a load supporting hydrodynamic fluid film and the other portion underlying and coacting with it to provide a tunable resilient supporting and damping means therefor.

16 Claims, 6 Drawing Figures

Patented July 24, 1973

LEO W. WINN
INVENTOR
BY
HIS ATTORNEY

Patented July 24, 1973

LEO W. WINN
INVENTOR

BY
HIS ATTORNEY

Patented July 24, 1973

LEO W. WINN
INVENTOR
BY
HIS ATTORNEY

Patented July 24, 1973 3,747,997

LEO W. WINN
INVENTOR
BY
HIS ATTORNEY

HYDRODYNAMIC FOIL BEARINGS

This invention relates generally to fluid film bearings and more particularly to improved hydrodynamic bearings of the type including a resilient load supporting bearing insert means. While the fluid film bearings of this invention may be operated with any suitable lubricant including multiphase, mixed and process fluids, they are particularly advantageous as gas lubricated and steam lubricated bearings and will be described in detail in that connection. Moreover, although the invention is illustrated and described in connection with rotational bearings such as those of the journal and thrust type, the invention is equally adaptable and advantageous for use with elements undergoing relative linear motion.

Hydrodynamic bearings are known which employ either resiliently compliant bearing foil supports which extend circumferentially about only a portion of the shaft or a plurality of separate bearing foils connected together in overlapping shingle type relationship to form a resilient unitary assembly about the shaft; the bearing foils complaintly supporting the shaft by virtue of their inherent spring stiffness.

While the foregoing prior art bearings are generally satisfactory for many applications, there is need to provide improvements in resilient hydrodynamic bearing as well as to reduce manufacturing costs thereof.

Accordingly, it is an object of this invention to provide a new and improved resilient hydrodynamic bearing which is simple and inexpensive to manufacture and is capable of operating at high bearing velocities.

It is another object of this invention to provide a new and improved resilient hydrodynamic bearing which is inexpensive to manufacture, has long operating life and which exhibits increased viscous and Coulomb damping.

It is yet another object of this invention to provide a new and improved resilient hydrodynamic bearing operable with all suitable lubricants including gaseous, liquid, multiphase and process fluids and mixtures thereof.

It is a further object of this invention to provide a new and improved resilient hydrodynamic bearing which does not require high machining accuracy, nor precise alignment or maintenance of dimensions during operation and which is simple and inexpensive to manufacture and assemble.

Briefly stated, in accordance with one aspect of this invention a new and improved hydrodynamic fluid film bearing is provided which comprises a resilient bearing insert structure adapted to be positioned between the confronting surfaces of first and second relatively movable members. The resilient bearing insert structure comprises a bearing element means arranged to provide a plurality of longitudinally spaced-apart regions. Each region includes a working portion, which functions during operation of the bearing when there is relative movement between the first and second members, to create a load supporting hydrodynamic fluid film. In addition, each region also includes a tunable resilient supporting and damping portion which is operative during such bearing operation to render the bearing stable, maintain the fidelity of the working portion and the efficiency of its hydrodynamic operation.

The resilient bearing insert may be provided from a single bearing element means having suitable corrugations formed therein or from a plurality of separate bearing element means arranged in a coacting relationship to provide the required working portions and tunable resilient supporting and damping portions.

The term "bearing element" as used herein means a thin flexible film lubricated web or strip of metal or other suitable material whose thickness relative to its other dimensions is such that it will be deflected by the hydrodynamic film forces created during bearing operation. Examples of suitable bearing elements are thin flexible spring webs or strips of steel, suitable polymeric materials such as polytetrafluoroethylene, or other materials which will function in the particular operating environment to cause the creation of a load-supporting hydrodynamic fluid film.

The novel features believed characteristic of this invention are set forth with particularity in the appended claims. The invention itself, however, and method of operation together with further objects and advantages thereof may best be understood by reference to the following description taken in conjunction with the accompanying drawings wherein like reference numerals designate the same or similar components and in which:

Figure 1:
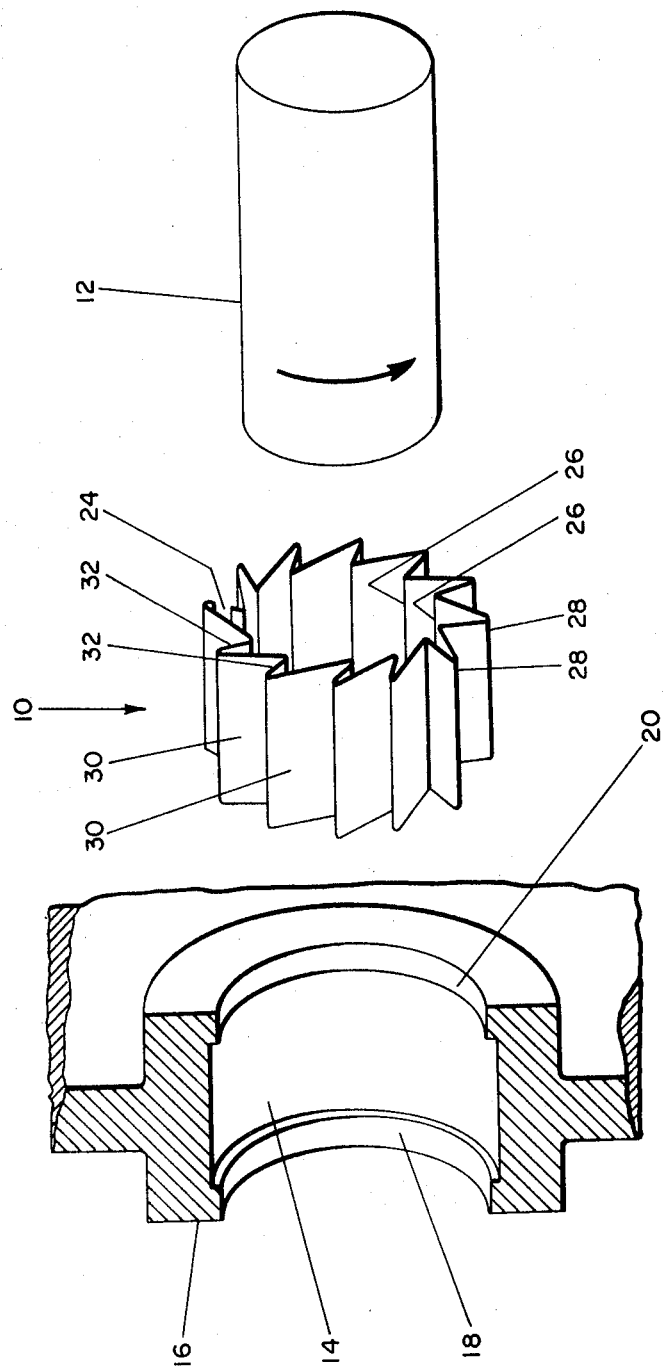
FIG. 1 is a diagrammatic exploded partial section view of an embodiment of a hydrodynamic journal bearing constructed in accordance with this invention.

In FIG. 1 there is shown a universal hydrodynamic journal bearing in accordance with one embodiment of the invention. As shown, the journal bearing comprises a resilient bearing insert structure 10. Insert structure 10 is adapted for disposition between the confronting surfaces defined by the shaft 12 and the surface of the bore 14 of a suitable supporting structure 16, which may be a shaft housing. During bearing operation when there is relative movement between the shaft 12 and the supporting structure 16, the resilient bearing insert structure is operative to cause a load supporting hydrodynamic fluid film to be created to support the shaft 12 in its supporting structure.

Outward movement of the insert structure 10 during bearing operation is prevented by the shoulders 18 and 20 disposed at opposite ends of the bore 14 and defining therebetween an insert receiving and retaining opening. Rotary movement of the insert structure 10 with respect to the supporting structure may be prevented in any suitable manner such as, for example, by spot welding or otherwise suitably securing the insert structure to the supporting structure. Alternatively, the insert structure 10 may be provided with a suitable retaining means adapted to engage a slot or other suitable opening in the surface of bore 14. For example, as illustrated more clearly in FIG. 2, one end of the insert structure 10 may be bent outwardly to form an extending lip 21 which engages the opening 22 in the surface of bore 14. No further securing means is required and the insert structure 10 is allowed some movement to accommodate differential expansion, centrifugal shaft growth and the like.

In accordance with this invention, the resilient bearing insert structure comprises bearing element means arranged to provide a plurality of longitudinally spaced-apart load supporting and damping regions. Each of the load supporting and damping regions includes a working portion, which functions during bearing operation to create a load supporting hydrodynamic fluid film, and a tunable resilient supporting and damping portion which functions to render the bearing stable and maintain the fidelity of the working portion and the efficiency of hydrodynamic operation.

This is accomplished in the embodiment shown in FIG. 1 by a resilient bearing insert structure 10 which comprises a bearing element means adapted to fit about the shaft 12 and being formed to a generally zigzag configuration to provide a plurality of longitudinally spaced-apart corrugations 24 having their crests 26 on one face of the bearing element means and their crests 28 on the opposite face thereof.

Figure 2:
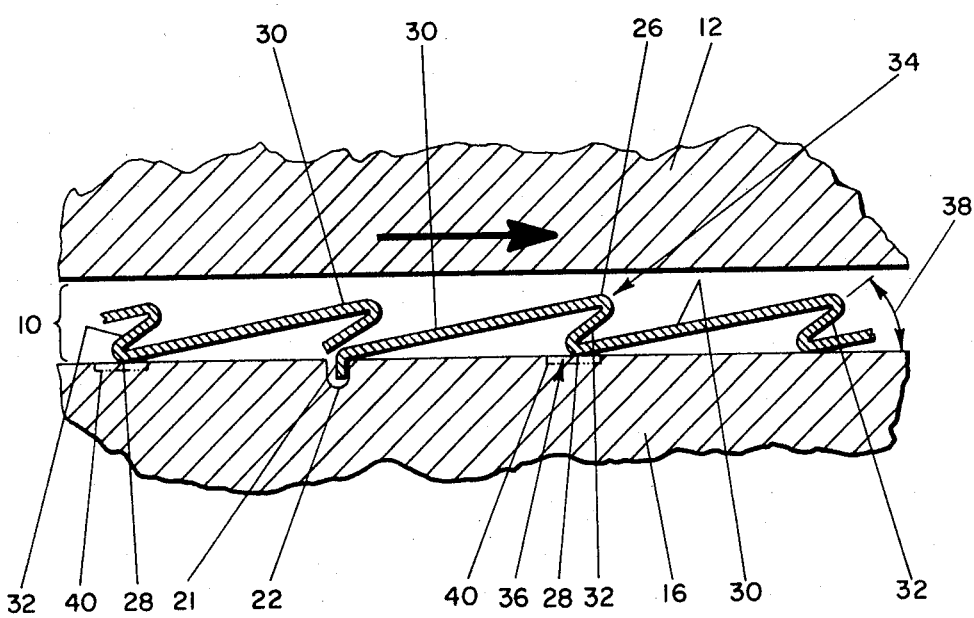
FIG. 2 is a diagrammatic section view of a portion of a hydrodynamic bearing in accordance with one embodiment of this invention.

As illustrated more clearly in FIG. 2 the crests 26 may be disposed adjacent the surface of shaft 12 and the crests 28 adjacent the surface of the bore 14. Thus the crests 26 and 28 are alternately on opposite faces of the bearing element means and disposed adjacent the associated confronting surfaces of the shaft and the supporting structure.

Each of the corrugations 24 is defined by the oppositely directed portions 30 and 32. The portions 30 and 32 terminate at one of their ends 34 in an angle which diverges in one direction to form the crest 26 and at their other ends 36 in an angle which diverges in the opposite direction to form the crest 28. Preferably, the angle 38 between the portion 32 and the surface of the bore 14 should be less than about 20°. If desired, the bore 14 may be provided with suitable transverse slots, shown in phantom at 40, to allow for adjustment of the angle between the portion 30 and the surface of the bore.

The portion 30 of each of the corrugations 24 is operative during bearing operation to cause a load supporting hydrodynamic fluid film to be created. At the same time the portion 32 of each of the corrugations 24 is operative to provide a tunable resilient supporting and damping means which renders the bearing stable and maintains the fidelity of the portion 30 and the efficiency of its hydrodynamic operation.

The hydrodynamic effect is well known in the art and the load supporting fluid film is formed, for example, in a manner similar to that of the hydrodynamic fluid film wedges which are created between a tilting pad and a confronting bearing surface.

The profile of the load supporting and damping corrugations during bearing operation is determined by the pressure distribution in the lubricant fluid film, the stiffness of the bearing element means and the stiffness of the portion 32.

The cooperative action of the two different portions 30 and 32 of each of the corrugations 24 also provides for unique cushioning and damping to imposed fluctuating loads. Such fluctuations may be caused by orbital excursions of the shaft within the limiting confines of the bore of the supporting structure. The energy of such shaft excursion is dissipated by a combination of viscous damping in the fluid film and Coulomb friction.

As described, the resilient bearing insert structure 10 provides both a hydrodynamic fluid film load supporting bearing function and a tunable resilient supporting and damping function. To assure that these two functions are provided, the bearing element means must be capable of being deflected by the hydrodynamic film forces acting upon it. The thickness of the element must be great enough to give the resilient bearing insert structure adequate resiliency but must not be so thick as to give it a rigid body reaction.

As stated previously, bearing elements of this type are thin flexible film lubricated webs or strips whose thickness relative to its other dimensions is such that it will locally deflect due to the hydrodynamic film forces. To some extent the bearing application requirements and operating environment will determine the suitability of a given material for use as a bearing element. In general, however, the material should have suitable properties of elasticity, stiffness, fretting resistance, thermal conductivity and stability. Suitable bearing elements have been made from thin flexible strips of tempered spring steel such as SAE 1030 or SAE 1040 which element may be coated with a suitable low friction material such as polytetrafluoroethylene or molybdenum disulphide if desired. For higher temperature applications the bearing element may be made from Tantalum, Tungsten or Molybdenum. Suitable bearing elements for use in bearings in accordance with this invention have had a thickness in the range of 0.0005 to 0.005 inches. Also in a particular bearing constructed in accordance with the embodiment of FIG. 1, corrugations having a vertical height in the range of 0.001 to 0.030 inches were found to be entirely satisfactory. Further, the ratio of pitch to overlap may be in the range of one to 10 wherein the term "pitch" means the effective repeatable length of the corrugations, the sum of which equals the entire length of the bearing element and the term "overlap" means the projected length of the portion 32 on the portion 30.

Figure 3:
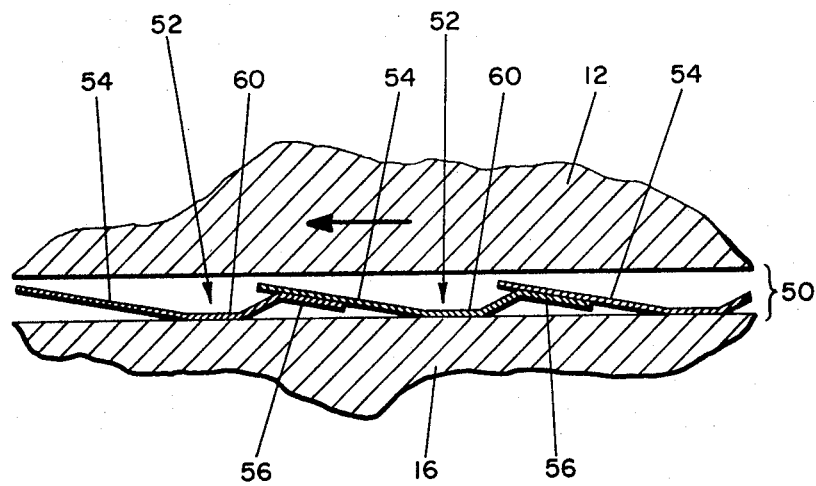
FIG. 3 is a diagrammatic section view of a portion of a hydrodynamic bearing in accordance with another embodiment of this invention.

In FIG. 3 there is shown a sectional view of a portion of a hydrodynamic bearing in accordance with another embodiment of the invention. The overall combination shown is similar to that described in connection with the embodiment of FIG. 1, however, the bearing insert has a slightly different structure. Thus, as shown, a resilient bearing insert structure 50 is positioned between the confronting surfaces defined by the shaft 12 and the bore 14 of the shaft housing 16. During bearing operation the resilient bearing insert structure 50 is operative to cause a load supporting hydrodynamic film to be created to support the shaft 12 in its housing.

In accordance with this embodiment of the invention the resilient bearing insert 50 comprises a plurality of bearing element means 52 each of which includes a pair of oppositely directed portions 54 and 56. The bearing element means 52 are arranged within the bore to provide for a plurality of coacting pairs of oppositely directed portions of adjacent bearing element means in overlapping relationship and with each such coacting oppositely directed pair circumferentially spaced-apart about the shaft.

As shown in FIG. 3 each of the bearing element means 52 may be provided with a central region 60 adapted to be secured to the surface of the bore 14 in any suitable manner, such as by spot welding.

Alternatively, the bearing element means 52 may be suitably arranged and secured to a base member 62 to provide a unitary assembly. As so formed, the assembly comprises a plurality of longitudinally spaced-apart pairs of oppositely directed overlapping portions.

Figure 4:
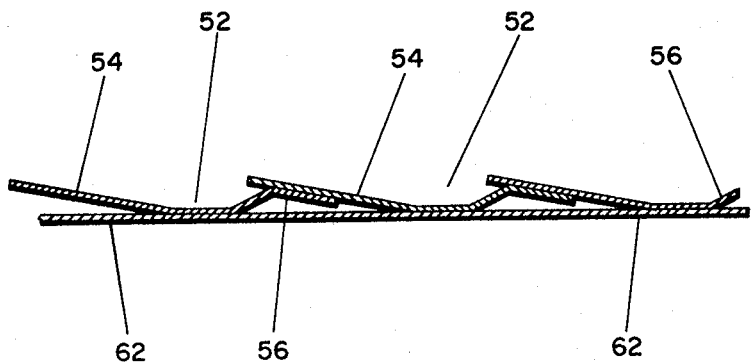
FIG. 4 is a diagrammatic section view of a portion of a hydrodynamic bearing in accordance with another embodiment of the invention.

In each of the arrangements illustrated in FIGS. 3 and 4 one of the portions of each pair constitutes a working portion and the other portion of each pair constitutes a tunable resilient supporting and damping means. For example, the portion 54 provides the working portion which causes a load-supporting hydrodynamic fluid film to be created. At the same time, the portion 56, whose terminal region is in coacting relationship with the terminal region of portion 54, provides a tunable resilient supporting and damping means operative to render the bearing stable and maintain the fidelity of the working portion 54 and the efficiency of its hydrodynamic operation.

Figure 5:
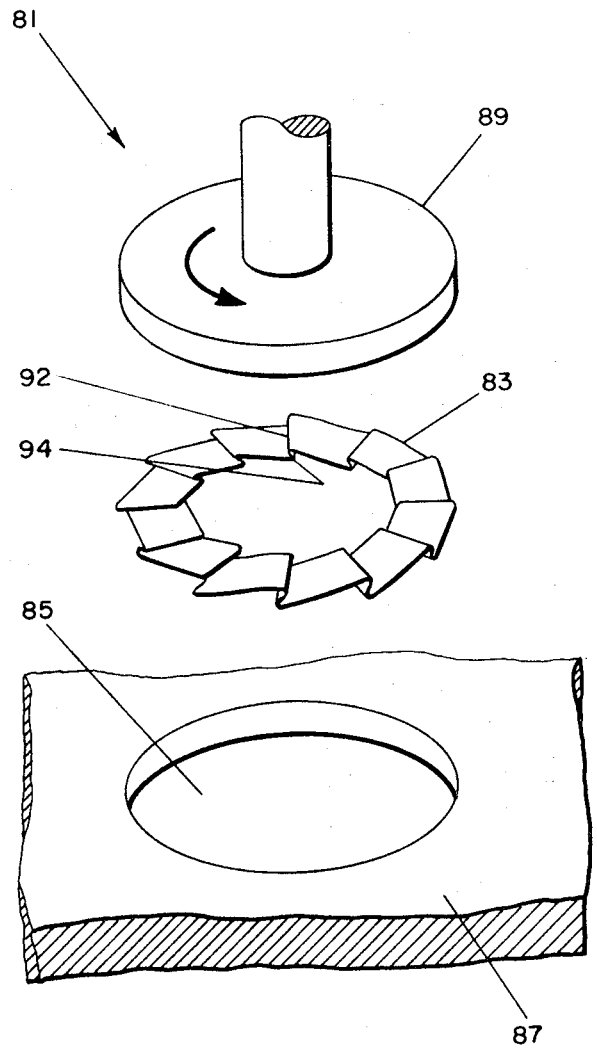
FIG. 5 is a diagrammatic exploded partial section view of an embodiment of a hydrodynamic thrust bearing in accordance with this invention.

Referring now to FIG. 5 there is shown a new and improved universal hydrodynamic thrust bearing in accordance with this invention. The thrust bearing, generally designated as 81, is shown in exploded view in vertical disposition and comprises a resilient bearing insert structure 83 adapted to fit within a thrust pocket 85 provided in housing 87. The movable member is shown as a rotor 89. The insert structure 83 comprises bearing element means, formed by any suitable method to provide a plurality of circumferentially spaced-apart load supporting and damping regions. As described, each of the load supporting and damping regions includes a working portion and a resilient supporting and damping portion. The working portion functions during bearing operation to create a load supporting hydrodynamic fluid film while the resilient supporting and damping portion functions to render the bearing stable and maintain the fidelity of the working portion and the efficiency of its hydrodynamic operation.

Conveniently, the bearing element means may be formed with generally zig-zag corrugations 90 having their crests 92 on one face thereof and their crests 94 on the opposite face.

Figure 6:
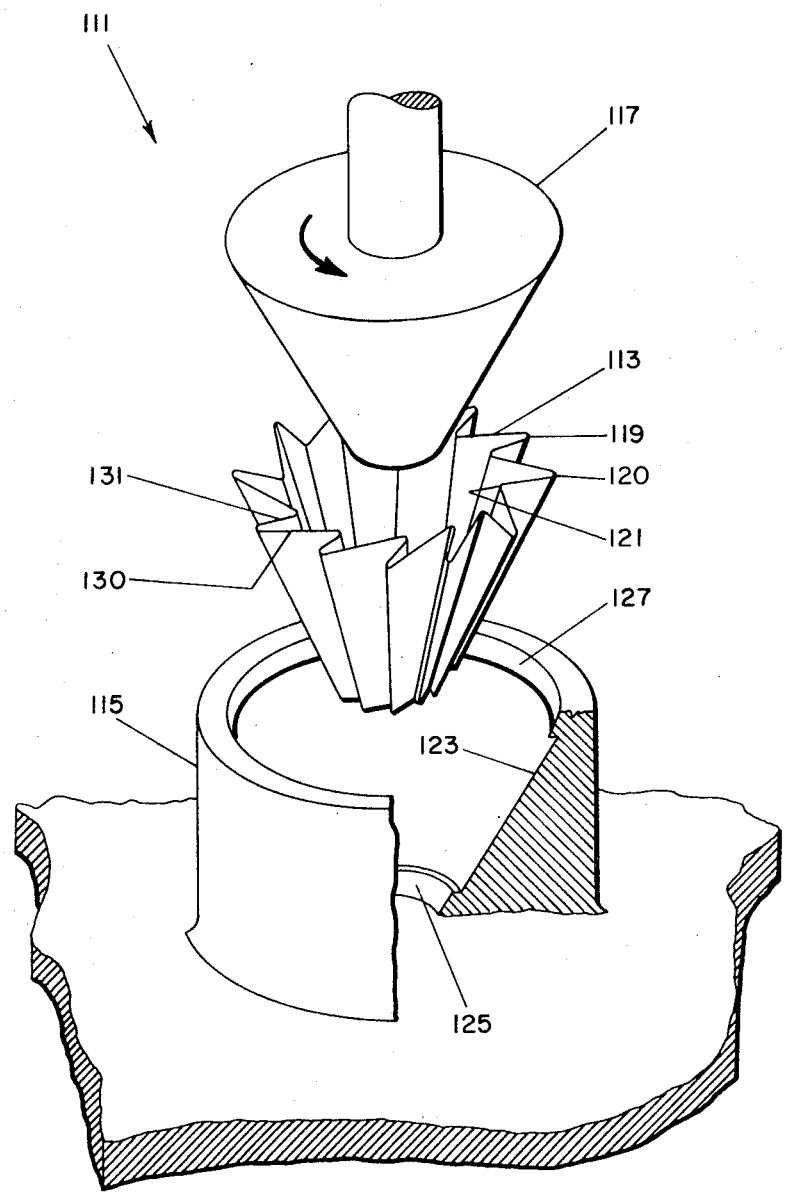
FIG. 6 is a diagrammatic exploded partial section view of a hydrodynamic conical bearing in accordance with this invention.

Referring to FIG. 6 there is shown a new and improved universal hydrodynamic conical bearing in accordance with this invention. The bearing, generally designated as 111, is shown in exploded view, in vertical disposition, and comprises a resilient bearing insert structure 113, a housing 115 and a rotor 117. The insert structure 117 comprises a suitable bearing element means formed with at least two corrugations 119. Corrugations 119 have their crests 120 on one face of the bearing element means and their crests 121 on the opposite face thereof and are operative to provide load supporting and damping regions. The insert 117 is adapted to fit into the conical bore 123 and is prevented from outward movement by shoulders 125 and 127. Rotational movement of insert structure 117 may be prevented by spot welding such structure to the surface of the conical bore 123.

Each of the corrugations 119 includes a working portion 130, which functions during bearing operation to create a load supporting hydrodynamic fluid film, and a resilient supporting and damping portion 132, which functions to render the bearing stable and maintain the fidelity of the working portion 130 and the efficiency of its hydrodynamic operation.

Although there have been described herein what are considered at present to be preferred embodiments of the invention, many modifications and changes may occur to those skilled in the art. It is intended, therefore, that the appended claims cover all such modifications and changes as fall within the true spirit and scope of the invention.

We claim:

1. A hydrodynamic fluid film bearing comprising: first and second members movable relative to one another and disposed to form a spacing between the confronting surfaces thereof; and a resilient bearing insert structure positioned within said spacing between said confronting surfaces anchored to one of said members and operative under dynamic conditions to establish a tunable hydrodynamic fluid film support for the other member, said resilient bearing insert structure including a preformed bearing element to provide a plurality of longitudinally spaced-apart corrugations of generally Z configuration each of which includes a first crest on one surface of said bearing element and a second crest on the opposite surface thereof which trails said first crest in the direction of motion between said first and second members and the portion preceding said first crest comprises a working portion operative under dynamic conditions to create a load-supporting hydrodynamic fluid film and the portion following said first crest comprises a tunable resilient supporting and damping portion operative to render said bearing stable, maintain the fidelity of said working portion and the efficiency of its hydrodynamic operation.

2. A resilient hydrodynamic fluid film bearing comprising: first and second members movable relative to one another and disposed to form a spacing between the confronting surfaces thereof; and a resilient bearing insert structure comprising bearing elements preformed to present one or more load supporting regions positioned within said spacing between said confronting surfaces and anchored to one of said members to be operative under dynamic conditions to establish a tunable hydrodynamic fluid film support for the other member, each of said load supporting regions of said resilient bearing insert structure comprising a first preformed section one end of which defines an angle with the confronting surface of the member to which said insert structure is anchored which diverges in the direction of motion between said first and second members and the other end of which terminates in a first crest to provide a first working portion operative under dynamic conditions to create a load-supporting hydrodynamic fluid film and a second preformed section one end of which defines an angle with the confronting surface of the member to which said insert structure is anchored which diverges in the direction opposite the direction of motion between said first and second members and the other end of which terminates in a second crest which trails said first crest in the direction of motion to provide a second portion which underlies and operatively coacts with said first working portion to effect a tunable resilient supporting and damping means for said first working portion operative to render said bearing stable, maintain the fidelity of said working portion and the efficiency of its hydrodynamic operation.

3. The hydrodynamic fluid film bearing recited in claim 1 wherein said resilient bearing insert structure is formed from a continuously extending bearing element.

4. The hydrodynamic fluid film bearing recited in claim 1 wherein said resilient bearing insert structure includes a plurality of separate sections of bearing element.

5. A resilient hydrodynamic fluid film bearing comprising: first and second members movable relative to one another and disposed to form a spacing between the confronting surfaces thereof; and a resilient bearing insert structure positioned within said spacing between said confronting surfaces anchored to one of said members and operative under dynamic conditions to establish a tunable hydrodynamic fluid film support for the other member, said resilient bearing insert structure comprising a preformed bearing element including at least one corrugation of generally Z configuration having a first portion terminating at one end adjacent the confronting surface to which said insert structure is anchored in an acute angle which diverges in the direction opposite the direction of motion between said first and second members and forms a first crest on one surface of said bearing element and a second portion terminating at one end in said first crest and at the other end adjacent the confronting surface to which said insert structure is anchored in an acute angle which diverges in the direction of motion between said first and second members and forms a second crest on the opposite surface of said bearing element which trails said first crest in the direction of motion so that said second portion is spaced from and underlies part of said first portion and so that said crests are disposed adjacent the associated confronting surfaces of said first and second relatively movable members whereby said first portion of each of said corrugations is operative under dynamic conditions to create a load-supporting hydrodynamic fluid film and the said second portion thereof is operative to provide a tunable resilient supporting and damping means to render said bearing stable, maintain the fidelity of the said first portion and the efficiency of its hydrodynamic operation.

6. The resilient hydrodynamic bearing recited in claim 1 wherein the ratio of the pitch to overlap of said corrugations is in the range of about 1 to 10.

7. The resilient hydrodynamic bearing recited in claim 5 wherein said resilient bearing insert structure is formed from a continuously extending bearing element.

8. The resilient hydrodynamic bearing recited in claim 5 wherein said resilient bearing insert structure comprises a plurality of preformed sections of bearing element.

9. The resilient hydrodynamic bearing recited in claim 7 wherein said bearing is of the journal type the first member is a housing having an opening, the second member is a rotatable shaft received within said opening and said resilient bearing insert structure is anchored to the internal surface of said opening and extends generally circumferentially about said shaft.

10. The resilient hydrodynamic bearing recited in claim 1 wherein said bearing is of the journal type the first member is a housing having an opening, the second member is a rotatable shaft received within said opening and said resilient bearing insert structure is anchored to the internal surface of said opening and extends generally circumferentially about said shaft.

11. The resilient hydrodynamic bearing recited in claim 2 wherein said bearing is of the journal type the first member is a housing having an opening, the second member is a rotatable shaft received within said opening and said resilient bearing insert structure is anchored to the internal surface of said opening and extends generally circumferentially about said shaft.

12. The resilient hydrodynamic bearing recited in claim 1 wherein the confronting surface of said one relatively movable member comprises a plurality of transverse slots adapted to receive said second crests and being operative to effect adjustment of the angle between said working portion and said confronting surface.

13. The resilient hydrodynamic bearing recited in claim 5 wherein the confronting surface of said one relatively movable member comprises a plurality of transverse slots adapted to receive said second crests and being operative to effect adjustment of the angle between said working portion and said confronting surface.

14. The resilient hydrodynamic bearing recited in claim 10 wherein the internal surface of said opening is provided with a plurality of transverse slots adapted to receive said second crests and being operative to effect adjustment of the angle between said working portion and said internal surface of said opening.

15. The resilient hydrodynamic fluid film bearing recited in claim 2 wherein said resilient bearing insert structure comprises a plurality of preformed sections of bearing element spaced-apart in the direction of motion between said first and second members and wherein said first working portion which creates said load supporting hydrodynamic fluid film and said second portion which effects the tunable resilient supporting and damping means for said first working portion comprise oppositely directed regions of adjacent sections of bearing element in sliding friction contact relationship.

16. The resilient hydrodynamic fluid film bearing recited in claim 2 wherein said resilient bearing insert structure comprises a plurality of separate preformed sections of bearing element spaced-apart in the direction of motion between said first and second members and wherein each of said sections includes first and second regions extending in opposite directions, said first region of one section of bearing element being disposed in sliding friction contact relationship with the second oppositely extending region of the adjacent sectio of bearing element and forming respectively said coacting first working portion and second portion which effects the tunable resilient supporting and damping means for said first working portion.

* * * * *